Patented Jan. 13, 1942

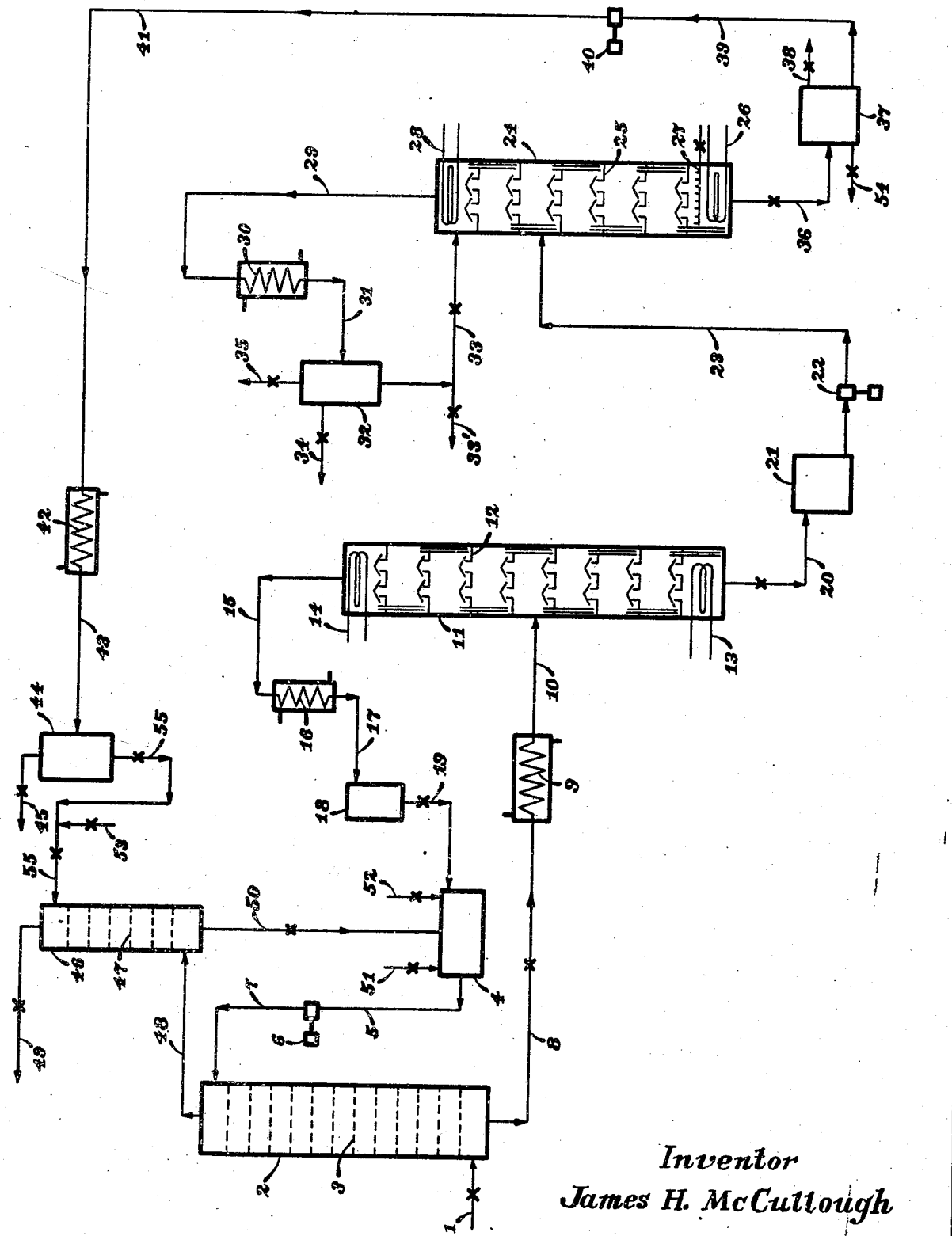

2,269,467

UNITED STATES PATENT OFFICE 2,269,467

RECOVERY OF SOLVENT FROM HYDROCARBON OILS

James H. McCullough, Philadelphia, Pa., assignor to The Atlantic Refining Company, Philadelphia, Pa., a corporation of Pennsylvania Application January 24, 1940, Serial No. 315,337

6 Claims. (Cl. 196—32)

The present invention relates to a method of recovering residual solvent from hydrocarbon oil, and relates more particularly to a method of recovering methanol from hydrocarbon oil which has been treated with a solution of an alkaline reagent in methanol for the removal of sulfur compounds from said oil.

My invention is especially adapted for use in conjunction with the oil refining process disclosed and claimed in U. S. Patent #1,968,842 to Malisoff, which process comprises treating a mercaptan-containing oil with a solution of an alkaline reagent in an organic solvent, thereby to convert the mercaptans into mercaptides soluble in the solvent, and separating the solution from the treated oil. While a solution of sodium hydroxide in methanol is the preferred treating agent, other alkaline reagents and other solvents may be suitably employed. Preferably the treating agent is substantially immiscible with the oil to be treated, or may be rendered so by the addition of small quantities of water or other substances.

In carrying out the oil refining process disclosed by Malisoff, the mercaptan-containing oil is intimately contacted with a small volume of a treating agent comprising, for example, a sodium hydroxide saturated solution of methanol containing 10% by volume of water. The mercaptan content of the oil is thereby converted into sodium mercaptides which are preferentially soluble in the treating agent. The spent solution of treating agent containing the mercaptides is then separated from the oil by decantation, and the solution may thereafter be subjected to treatment for the recovery of the mercaptans and the regeneration of the sodium hydroxide. Such treatment may consist in removing substantially all of the methanol by fractional distillation, and then heating the residue comprising water, unreacted sodium hydroxide, and sodium mercaptides, preferably in the presence of steam, to hydrolyze the mercaptides to mercaptans and sodium hydroxide, and removing the water and mercaptans by distillation to produce as a final distillation residue, a concentrated aqueous solution of regenerated sodium hydroxide.

Hydrocarbon oils treated for the removal of sulfur compounds in accordance with the patented process have been found to retain small but appreciable amounts of solvent, i. e., methanol. It is possible to remove the residual methanol from the oil by water washing, but considerable quantities of water are necessary, and the cost of separating the methanol from the water makes such method of recovery uneconomical and therefore impractical.

I have found that the residual methanol retained in the treated oil may advantageously be recovered therefrom by contacting or washing such oil with an aqueous alkaline solution, and preferably a concentrated aqueous solution of sodium hydroxide such as that recovered in the regeneration of the spent treating agent above described. By operating in accordance with my invention, I am able to remove substantially all of the methanol retained in the treated oil in such a manner that the recovered methanol and the concentrated sodium hydroxide solution employed in such recovery may be utilized directly in preparing a regenerated treating agent for reuse in the treatment of additional quantities of mercaptan-containing oil.

My invention may be further understood with reference to the accompanying drawing, which illustrates diagrammatically a system suitable for carrying out my recovery method.

Referring to the drawing, mercaptan-containing hydrocarbon oil, such as sour gasoline distillate, is introduced by means of valve-controlled pipe 1 into the lower section of contacting tower 2 provided with perforated baffles 3 or other suitable packing material. Treating agent, for example, 90% methanol saturated with dry sodium hydroxide, and hereinafter termed "caustic-methanol solution," is passed from make-up tank 4 through pipe 5, and is pumped by pump 6, through pipe 7 into the upper section of the contacting tower 2. The quantity of caustic-methanol solution to be employed varies with the quantity of distillate to be treated, the sulfur content of the distillate, and the conditions under which the treatment is carried out, but is generally of the order of from about 2% to about 10% by volume of the distillate. The sour gasoline distillate, being of lower specific gravity than the caustic-methanol solution, passes upwardly through the tower in intimate countercurrent contact with the descending flow of solution, and the mercaptan content of the distillate is thus converted into sodium mercaptides which are preferentially soluble in the caustic-methanol solution. Spent solution, substantially free of distillate, and comprising 90% methanol, unreacted caustic, sodium mercaptides, and traces of tarry matter and phenolic compounds, is withdrawn from the bottom of tower 2 and is passed by means of valve-controlled pipe 8 to a heating device such as a steam jacketed coil 9, wherein the temperature of the spent solution is raised, for example, to about 200° F. The heated solution is then introduced by means of pipe 10 into a suitable fractionating column 11 provided with bubble trays 12, heating coil 13, and dephlegmating coil 14. Herein the spent solution is fractionated to separate the methanol from the water, caustic, mercaptides, tar and phenolic compounds, the temperature within the column being controlled to prevent substantial decomposition of the mercaptides. Vaporized methanol, which may contain small amounts of water, is passed from the top of fractionating column 11 through pipe 15 to condenser 16, wherein the vapors are condensed, and the methanol condensate is conducted by means of pipe 17 to storage tank 18, from which it is supplied to make-up tank 4 by means of valve-controlled pipe 19.

The residue from the fractionating operation, comprising water, caustic, sodium mercaptides, tarry matter and phenolic compounds, is withdrawn from the bottom of column 11, at a temperature of, for example, 225° F. to 250° F., and is passed by pipe 20 into tank 21, from which it is pumped by pump 22 through pipe 23 into a hydrolyzing tower 24 provided with bubble trays 25, heating coil 26, steam jet 27, and dephlegmating coil 28. The solution in passing downwardly through the tower is subjected to additional heating, preferably by means of steam introduced at the bottom of the tower through jet 27, whereby the sodium mercaptides are hydrolyzed to free mercaptans and caustic soda is regenerated. If desired, the steam supplied through jet 27 may be dispensed with, and in lieu thereof, heating may be effected by circulating steam or other heating medium through the heating coil 26. The mercaptans and a portion of the water content of the solution are vaporized and pass upwardly through the tower, at least a portion of the water vapors being condensed by the dephlegmating coil 28 in the top of the tower. The vaporized mercaptans and water vapors passing the dephlegmating coil 28 are conducted from the top of the tower by pipe 29 and passed to condenser 30 wherein the vapors are condensed, the liquid condensate being passed by means of pipe 31 to separator 32. The mercaptans and water, being substantially immiscible with one another, are permitted to stratify into two layers in the separator, the mercaptans being withdrawn from the upper portion of the separator 32 through valve-controlled pipe 34 and disposed of as desired. The water is withdrawn from the bottom of the separator 32, and a portion thereof may be returned to the upper section of tower 24 by means of valve-controlled pipe 33, the remainder being removed from the system through valve-controlled pipe 33'. In the event that heat is supplied by heating coil 26, and open steam is not utilized, all of the water separated from the mercaptans in separator 32 may be returned to the tower 24 by means of valve-controlled pipe 33. The separator may be vented, when necessary, by means of valve-controlled pipe 35. By properly controlling the operation of the hydrolyzing tower, the mercaptans may be substantially separated from the water, unreacted caustic and regenerated caustic, tarry matter and phenolic compounds. This aqueous solution, which may contain from about 40% to about 50% of caustic soda, together with the tarry matter and phenolic compounds, is passed from the bottom of tower 24, at a temperature of, for example, 285° F., and under super-atmospheric pressure, through valve-controlled pipe 36 into tank 37, the tarry matter being permitted to stratify and collect in the upper portion of the tank, from which it may be withdrawn, when necessary, by means of valve-controlled pipe 38. Since a portion of the caustic soda content of the solution may eventually be converted into sodium sulfide or other stable salts during use in the system, a quantity of the solution may be periodically removed from the system through valve-controlled pipe 54, and replaced with fresh caustic soda. The solution, substantially free of tarry matter, is drawn from the bottom of tank 37 and passed by pipe 39 to pump 40, whereupon it is pumped through pipe 41 to cooler 42, wherein the solution is cooled, for example, to a temperature of the order of 70° F. to 80° F. As a result of the cooling, that portion of the phenolic compounds and/or tarry matter which was soluble in the solution, while hot, is caused to separate or precipitate from the cooled solution. This mixture is then passed from the cooler 42 through pipe 43 into separator 44, wherein the precipitated phenolic compounds and/or tarry matter is separated from the solution and drawn from the top of the separator by means of valve-controlled pipe 45. The cooled solution, comprising substantially a concentrated (40%–50%) aqueous solution of regenerated caustic soda, is passed from the upper portion of separator 44 through valve-controlled pipe 55 into the upper section of contacting tower 46 provided with perforated baffles 47, or other suitable packing material.

Gasoline distillate containing small amounts of methanol is withdrawn from the top of tower 2 and passed by means of pipe 48 into the lower section of tower 46. Since the specific gravity of the distillate is lower than that of the regenerated caustic soda solution introduced into the upper section of tower 46, the distillate flows upwardly through the tower in intimate counter-current contact with the descending flow of caustic solution, whereby the methanol content of the distillate is extracted by and dissolved in the caustic solution. The gasoline distillate, substantially free of methanol, is passed from the top of tower 46 through valve-controlled pipe 49 to storage (not shown). If desired, the distillate may be subjected to water washing prior to storage or other disposal thereof.

The caustic soda solution containing methanol extracted from the gasoline distillate is withdrawn from the bottom of tower 46 and is passed by means of valve-controlled pipe 50 into make-up tank 4, wherein it may be admixed with methanol from the initial fractionation in column 11. The make-up tank 4 may be provided with valve-controlled pipes 51 and 52, whereby fresh methanol and caustic solution, respectively, may be supplied to the make-up tank, as required. If desired, fresh caustic solution may be supplied to the upper section of tower 46 by means of valve-controlled pipes 53 and 55, although it is preferred to employ regenerated caustic solution for the extraction of residual methanol from the distillate supplied to tower 46.

While, in the system described above, I have shown the use of a single tower provided with perforated baffles for effecting counter-current extraction of distillate with the caustic solution, I may employ any other suitable means for obtaining intimate contact between the distillate and solution, for example, one or more towers filled with packing material, or an extraction system of one or more stages each comprising a mixing tank and a settling tank. Other modifications of the apparatus comprising my recovery system are considered within the scope of my invention.

Typical of the results which may be obtained in accordance with my invention are the following:

(1) Uncracked petroleum naphtha containing 1.07% by volume of methanol was extracted with regenerated aqueous caustic soda solution of 50% strength, the caustic solution being applied in 2 successive treats of 5% by volume each. The naphtha, after the extractive treatment, was found to contain only 0.003% methanol.

(2) Cracked gasoline containing 0.33% by volume of methanol was extracted with aqueous caustic soda solution of 45% strength, the caustic solution being applied in 1 treat of 1% by volume. The gasoline, after the extractive treatment, was found to contain 0.011% methanol.

(3) Uncracked petroleum naphtha containing 0.25% by volume of methanol was extracted with aqueous caustic soda solution of 45% strength, the caustic solution being applied in 1 treat of 1% by volume. The naphtha, after extractive treatment, was found to contain 0.011% methanol.

Hereinabove I have described the application of my invention in the recovery of methanol from gasoline distillate which has been treated with caustic-methanol solution for the removal of sulfur compounds. It is to be understood, however, that my invention is equally applicable to the recovery of solvents other than methanol which may be used in conjunction with alkaline reagents, and particularly the hydroxides, alkoxides, and carbonates of the alkali metals. Solvents such as ethyl, propyl, and isopropyl alcohols, glycols, glycerine, acetone, ethyl methyl ketone, dimethyl ketone, epichlorhydrin, and the like, may be suitably recovered from hydrocarbon oil in accordance with my method. Various modifications of the operating temperatures and pressures may be made, according to the nature and properties of the solvent to be recovered. In some instances, and particularly in the case of high boiling solvents such as glycol or glycerine, sub-atmospheric pressures may be advantageously employed in certain stages of my recovery process, in order to maintain the operating temperature within the desired range.

What I claim is:

1. In a process of removing mercaptan compounds from hydrocarbon oil involving contacting the oil with caustic methanol solution to form mercaptides soluble in said solution, separation of the mercaptide-containing solution from the oil, removal of methanol from the mercaptide-containing solution, and treatment of the resultant solution to decompose the mercaptides and produce an aqueous solution of regenerated caustic soda substantially free of mercaptides, the method of recovering residual methanol from the treated oil, which comprises contacting said oil with said aqueous solution of regenerated caustic soda to extract from said oil residual methanol.

2. In a process of removing mercaptan compounds from hydrocarbon oil involving contacting the oil with caustic methanol solution to form mercaptides soluble in said solution, separation of the mercaptide-containing solution from the oil, removal of methanol from the mercaptide-containing solution, and treatment of the resultant solution to decompose the mercaptides and produce an aqueous solution of regenerated caustic soda substantially free of mercaptides, the method of recovering residual methanol from the treated oil, which comprises contacting said oil with said aqueous solution of regenerated caustic soda to extract from said oil residual methanol, and separating from the oil said aqueous solution containing extracted methanol.

3. In a process of removing mercaptan compounds from hydrocarbon oil involving contacting the oil with caustic methanol solution to form mercaptides soluble in said solution, separation of the mercaptide-containing solution from the oil, removal of methanol from the mercaptide-containing solution, and treatment of the resultant solution to decompose the mercaptides and produce an aqueous solution of regenerated caustic soda substantially free of mercaptides, the method of recovering residual methanol from the treated oil, which comprises contacting said oil with said aqueous solution of regenerated caustic soda to extract from said oil residual methanol, separating from the oil said aqueous solution containing extracted methanol, and admixing said solution with methanol recovered from the mercaptide-containing solution first mentioned.

4. In a process of removing mercaptan compounds from hydrocarbon oil involving contacting the oil with caustic methanol solution to form mercaptides soluble in said solution, separation of the mercaptide-containing solution from the oil, removal of methanol from the mercaptide-containing solution, and treatment of the resultant solution to decompose the mercaptides and produce an aqueous solution of regenerated caustic soda substantially free of mercaptides, the method of recovering residual methanol from the treated oil, which comprises contacting said oil with said aqueous solution of regenerated caustic soda to extract from said oil residual methanol, separating from the oil said aqueous solution containing extracted methanol, admixing said solution with methanol recovered from the mercaptide-containing solution first mentioned, and recirculating the resulting solution for the treatment of additional quantities of mercaptan-containing oil.

5. In a process of removing mercaptan compounds from hydrocarbon oil involving contacting the oil with a solution comprising a lower aliphatic alcohol and an alkali metal hydroxide to form mercaptides soluble in said solution, separation of the mercaptide-containing solution from the oil, removal of the alcohol from the mercaptide-containing solution and treatment of the resultant mercaptide-containing solution to decompose the mercaptides and to produce an aqueous solution of regenerated alkali metal hydroxide, the method of recovering residual lower aliphatic alcohol from the treated oil, which comprises contacting the treated oil with said aqueous solution of regenerated alkali metal hydroxide to extract from said oil residual lower aliphatic alcohol.

6. In a process of removing mercaptan compounds from hydrocarbon oil involving contacting the oil with a solution comprising a lower aliphatic alcohol and an alkali metal hydroxide to form mercaptides soluble in said solution, separation of the mercaptide-containing solution from the oil and treatment of the mercaptide-containing solution to produce an aqueous solution of regenerated alkali metal hydroxide, the method of recovering residual lower aliphatic alcohol from the treated oil which comprises contacting the treated oil with said aqueous solution of regenerated alkali metal hydroxide to extract from said oil residual lower aliphatic oil.

JAMES H. McCULLOUGH.